April 21, 1936.  E. A. STALKER  2,037,942
MEANS OF REDUCING THE FLUID RESISTANCE OF PROPELLED VEHICLES
Filed Oct. 28, 1935   2 Sheets-Sheet 1
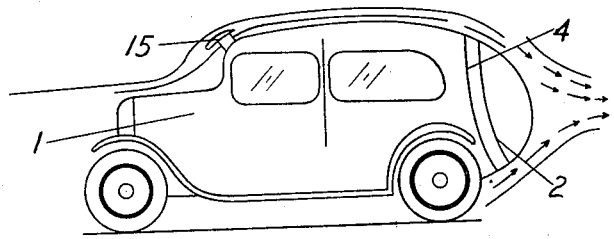
FIG. 2
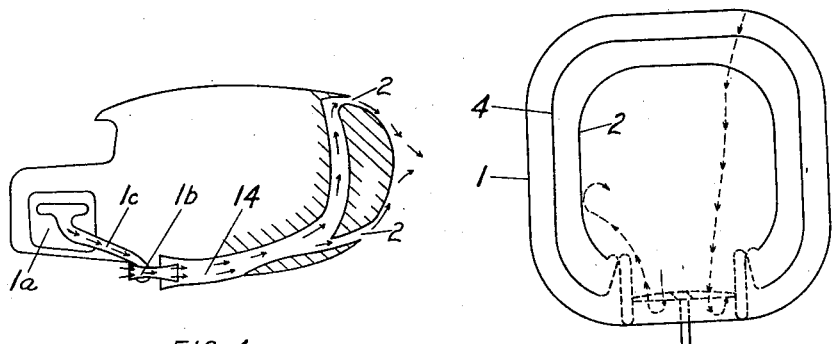
FIG. 4a
FIG. 3
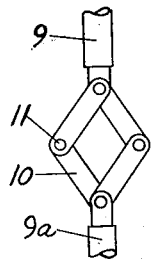
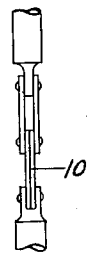
FIG. 1
FIG. 5   FIG. 6
INVENTOR
Edward A. Stalker April 21, 1936.  E. A. STALKER  2,037,942

MEANS OF REDUCING THE FLUID RESISTANCE OF PROPELLED VEHICLES

Filed Oct. 28, 1935  2 Sheets-Sheet 2

INVENTOR

Edward A. Stalker

Patented Apr. 21, 1936

2,037,942

UNITED STATES PATENT OFFICE 2,037,942

MEANS OF REDUCING THE FLUID RESISTANCE OF PROPELLED VEHICLES

Edward A. Stalker, Ann Arbor, Mich.

Application October 28, 1935, Serial No. 47,130

9 Claims. (Cl. 180—1)

My invention relates to automobiles and other blunt-ended vehicles and has for one of its objects the reduction of the fluid drag of the body by control of the boundary layer of fluid. It contains subject matter in common with my application of the same title, Serial No. 632,572 filed September 10, 1932.

I accomplish this object by the devices illustrated in the accompanying drawings in which—

Figure 1 illustrates the theory;

Figure 2 is a side elevation of the vehicle;

Figure 3 is a rear part view of the vehicle body;

Figure 4a illustrates an alternate form of the body;

Figures 5 and 6 illustrate two fragmentary views of the mechanism to drive the blower for circulating the slot fluid;

Figure 4:
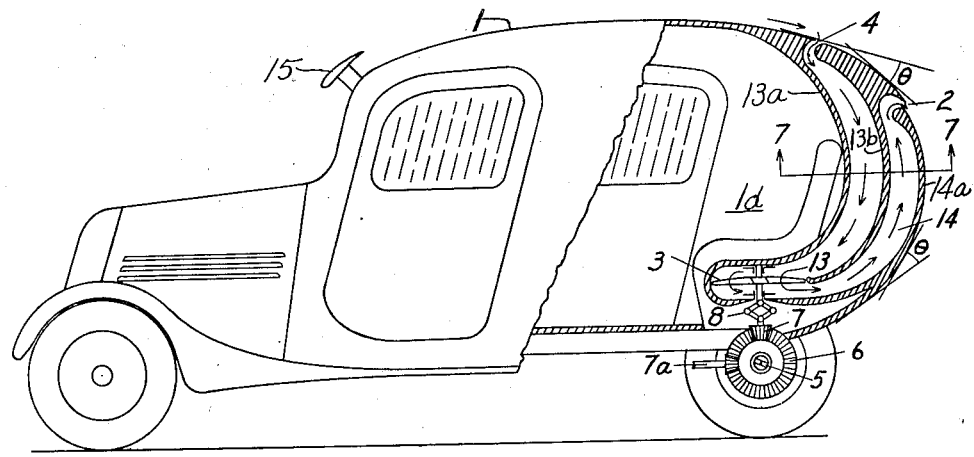
Figure 4 is a side elevation partly in section of the vehicle body.

When fluid flows along any surface there is a dissipation of energy as heat due to the friction between the fluid and the body. In fact at the surface of the body the fluid velocity is zero and only at some distance from the body does it attain the normal velocity. The layer of air close to the body and retarded by it is called the boundary layer. The presence of this layer is the reason that the flow does not close in smoothly behind a body, but rather becomes turbulent. The turbulent flow is indicative of a low pressure area downstream of the body which retards the relative movement between the body and the fluid. In the case of a vehicle, a resistance to forward motion appears.

The fluid may be made to follow the body contour if energy is added to the boundary layer to replace the energy dissipated in rubbing. Thus, if a jet is blown along the surface the boundary layer is accelerated and tends to move along with the remainder of the flow. If the boundary layer is removed by drawing it off the surface, the separation is likewise prevented. Both methods result in a great reduction of resistance, and there is a clear gain over and above the energy required for sucking and blowing.

Figure 1 shows in plan view the type of flow taking place behind a blunt body. The air fails to follow the contour of the rear end with the result that a partial vacuum is formed which becomes filled with turbulent air.

The localities at which energy should be added to the boundary layer are in the vicinity of rapid changes of curvature. The amount of energy necessary may be greatly lessened by taking advantage of the pressure distribution about the body. On the top and sides of some bodies, such as automobile bodies, the air pressure is practically atmospheric while further back on the curved surface the pressure is appreciably below atmospheric. If these two localities are interconnected there will be a flow inward at the front openings and outward at the rear openings. By permitting the ingress of the boundary layer at the first openings the main flow hugs the body closer so that a smaller turbulent region of low pressure is set up in the rear. By discharging the indrawn air rearward the main flow follows the body contour still further with again a reduction in resistance. Finally, if a blower is placed in the passage connecting the inlet and outlet openings the resistance of the body may be decreased still more. When only blowing is used the openings should be ahead of rounded corners to accomplish their purpose. Blowing openings on the rearward face of the rounded corner will accomplish nothing. When the whole rear end is rounded the blowing openings are preferably near the locality of the beginning of the curved rear end.

The ease with which the boundary layer may be energized is affected by the magnitude of the radius of curvature. A generous radius leads to easier energization than a small radius. A lower limit is about one foot in an automobile. Instead of using the radius as a criterion the rate of change of curvature which is a function of the radius to any point may be used. The rate of change of curvature may be specified in terms of the angle $\theta$ (see Figure 4) turned through by the tangent as it progresses rearward. It is to be understood that corrugations, beading and like structures on the surface are to be ignored in determining $\theta$. The distance rearward is to be measured substantially along the axis in the direction of the flow. The distance is then best expressed in terms of the maximum cross section of the body. Thus if a body is four feet wide, the curvature in a horizontal plane is referred to rearward distances given as a percentage of four feet. A like method would be used for the vertical height and curvature.

The rear end of the body should be well curved for still another reason. The suction pressure used to draw air inward acts on the body and tends to retard it. This is particularly true where the rear surface is practically perpendicular to the direction of motion. It is more efficient to apply the suction to surfaces more nearly parallel to the direction of motion, for then the suction force is mostly normal to the direction of motion and does not resist the motion of the body.

Figure 7:
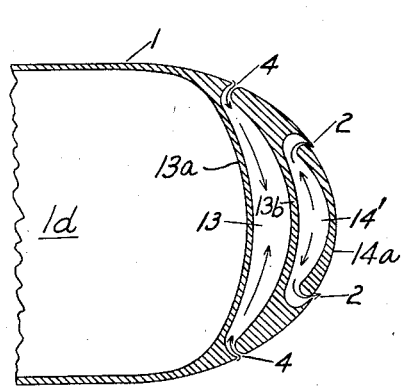
Figure 7 is a horizontal fragmentary section of the body taken along line 7—7 in Figure 4.

It is also desirable that the middle portion of the body have little curvature for the following reason. When fluid flows about a body curved so that the flow is displaced outward the flow velocity increases and there is a drop in static pressure. To induct fluid through a slot in such a surface requires more energy than to induct fluid through a slot in a plane surface. On the curved surface immersed in atmospheric air the pressure is below atmospheric while on a flat surface the pressure would be just atmospheric. It is for this reason that I locate the induction slots near or ahead of the beginning of the curvature of the rear end. (See Figures 4, 7 and 8.)

The portion of the body between the windshield and the vertical plane (reference plane) through the rear axle I call the central portion of the body. Since it is the portion which accommodates the passengers it is of relatively uniform height. From this plane rearward the body can be tapered or curved to a blunt end without cramping the passengers. Measuring from this reference plane the body should preferably be curved smoothly to a blunt end within a distance less than one and one-half times the body height at the reference plane. If the rear end tapers more gently than this, boundary layer control is not as efficient as streamlining, that is, bringing the rear end smoothly to a relative thinness.

It is, however, important in automobiles that the body be short so that it does not protrude so far beyond the rear wheels that it is liable to collide with objects in making a turn.

The rate of change of $\theta$ should lie between the following limits. The tangent should not turn through a greater angle $\theta$ than 20 degrees in progressing rearward ten per cent of the maximum width or height in the vicinity of the transition section from middle section to rear end section. I especially prefer that this angular limit for the tangent be observed in forming the curvature aft of the slot. That is, one of the starting points or datums for measuring $\theta$ is to be taken at a slot preferably.

In Figures 2, 3 and 4 the automobile body is 1.
This body devotes a major portion of the hollow interior 1d to the accommodation of the passengers. Only a small portion of the rear end of the body is used in the control of the boundary layer.

As shown best in Figures 4, there are two compartments 13 and 14. Compartment 13 communicates exteriorly of the body through the slot 4 which extends about the aft end of the body. That is, the slot extends along opposite sides, across the top and in part across the bottom. This is clearly shown in Figure 3.

The compartment 14 communicates exteriorly of the body through the slot 2 which extends transversely about the body similarly to slot 4.
The two compartments 13 and 14 extend well around on all sides of the body rear end (see also Figure 7) and communicate with each other through the opening which accommodates the fan 3.
Rotation of the fan induces an inflow through the slot 4 and an outflow through the slot 2. The flows accomplish the energization of the boundary layer and reduce the drag of the body.

In Figure 4 is also shown the axle 5 used to drive the rear wheels. The bevel gear 6 is the usual gear on the differential housing for propelling the car. The drive shaft is indicated by 7a.

A bevel gear 7 is in mesh with 6 to drive the fan 3. The torque of the gear 7 is transmitted through the hinged frame 8 which will now be described.

The purpose of the frame is to permit the axle to move up and down with relation to the body to which the fan shaft 9 is rigidly connected. The frame 8 consists of four links 10 hinged at their ends as shown in Figures 5 and 6.

An alternative to the frame 8 is the use of a splined shaft connection. It would also be possible to carry the fan rigidly on the axle housing 20 and let the fan move up and down in the end of the passage 12. The fan may also have any inclination to the ground and be of any type.

As an alternative to the fan the exhaust from the engine may be used as a jet pump as shown in Figure 4a. The exhaust pipe 1c leads to the throat of the venturi 1b where a flow through 1b is created by jet action according to any of the well known methods. The discharge of the venturi is into a bell mouthed opening which is the entrance to passage 14' leading to the exit slots 2. The exhaust jet augments the natural flow into the passage 14' due to the car's motion.

It is important that the discharge passages be formed so that the fluid is well guided up to the discharge opening. For this reason I do not prefer the ordinary stamped louver which does not provide a passage wall on one side since the other side does not project appreciably beyond the hole edge left by the metal which has been stamped out.

I am familiar with the English patent to N. V. Instituut, etc. Number 223,203, dated 1925. In the structures set forth, there is no means of using the impact of the fluid motion to energize the boundary layer on the rear end by blowing out suitably formed slots. Furthermore, such slots as are shown will not accomplish the purpose of reducing the power required for propulsion. The blowing openings must be on the side of the rounded corner and not on the rear face of a blunt body. Furthermore, a well rounded rear end is essential if any reduction of power is to be achieved. A flat rear end will not provide any appreciable reduction of resistance (and hence power) with either blowing or suction. The fluid fails to make the turn at the rear end due to the accumulation of the boundary layer. Then the boundary layer must be removed or accelerated before the turn is reached and not at some point far around on the rear end. I have therefore provided well rounded rear ends and in the case of rounded corners I have located the blowing openings on the sides of the corners and not on the rear faces. Also, the blowing openings are near the corners or curves.

This invention also differs from the above patent in that a means is provided to utilize the natural pressure distribution on the type of body to energize the boundary layer.

The walls in which the slot is provided are preferably the walls of the body proper so that the smoothness of the body surface is preserved in the neighborhood of the slot.

Air or other fluid is discharged outward through the slot from the interior of the body compartment 14. The fluid thus passes out the slots rearward along the surface preferably through all four sides of the body. The slots are narrow so that the sheet of fluid discharged is thin.

This arrangement is uniquely different than that set forth in my Patent Number 1,871,396 issued August 9, 1932. In this patent the vane 2 forms a passage between itself and the body proper 10, and the inlet opening of the passage is directed into the relative flow along the body. The vane being bathed on all sides by the relative flow and being inclined so as to direct the flow inward offers an appreciable resistance. It is also to be noted that the area of the inlet to the passage is substantially equal to the exit.

I have found it possible to eliminate the resistance of the vane by suppressing it entirely and locating a slot in the surface of the body proper. I then blow air out the slot from the body interior. By using a pump to suck in the air I keep the frontal area of the induction opening small and so reduce the resistance tending to arise from the induction. The preferred size of the inlet area, if it is directed into the stream, is then of the order of 5 per cent of the maximum cross sectional area of the body taken transverse to the direction of travel.

By locating the slots in the body surface the slot width can be made very small and relatively invisible, which adds very much to the appearance of the vehicle. This is the preferred form for the opening for the induction of the air.

It is desirable to use a plurality of slots, either suction or blowing. Such duplication is not practicable or feasible with vanes because of appearance and because each vane due to its resistance slows the relative flow so much that little is gained in reducing the body resistance by the addition of another vane. On the other hand, additional slots in the body surface do not detract from the appearance and they are not affected adversely by the presence of more forward located slots. On the other hand each successive slot is aided by the presence of the preceding slot. The first slot, for instance, maintains the flow close to the body until within the regime of influence of the second slot. The jet from the second slot can have any desired velocity and can effectively take hold of the relative flow and induce it to follow further about the body by the boundary layer control exercised.

The vanes are distinguished from the use of surface slots in that the vanes form with the body proper a passage directed forward and outward from the body surface while the surface slots lead into the compartment 14, and hence the slots may communicate within across the body from lateral face to lateral and from top to bottom at least in part.

It will also be observed that slots 2 communicate interiorly through the compartment 14 which turns inward upstream relative to the flow, that is, the walls 13b and 14a of the compartment are directed inward upstream or transverse to the direction of forward travel of the vehicle.

The compartments 13 and 14 occupy a minor portion of the volume of the interior of the body 1. A major portion of the space is devoted to the cargo space 1a separated from compartment 13 by the wall 13a.

Figure 8:
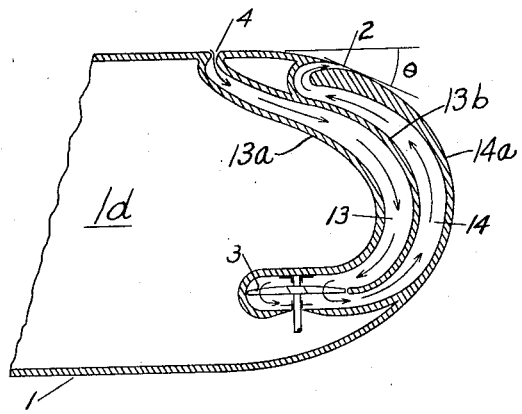
Figure 8 is a fragmentary vertical section of a vehicle body taken along the plane of symmetry to illustrate an alternate location of the slots.

Figure 8 shows a more forward location of the slot 4 than that shown in Figure 4. The two figures illustrate the preferred range of location of the induction slot near the beginning of the body curvature.

I claim:

1. In a vehicle adapted for self propulsion chiefly on the ground, a vehicular body having a compartment within and associated with a relative wind and having a blunt rounded aft end creating fluid turbulence to the rear thereof and composed of a rear face joined to the body sides by a curved surface, said body having a substantially rearward directed vertically extensive slot in each of the vertically extensive side surfaces disposed on opposite sides of the said body, said slots being in communication with the body compartment whose walls are extensive across the direction of the relative wind and in major part closed to the head-on impact of the relative wind, said slots being nearer the aft end than the longitudinal middle of the body and the walls of said slots being formed to direct the flow therethrough rearward substantially along the surface of the body aft end, and a means to induce a flow of fluid through said slots to energize the boundary layer on the aft end and relieve the said air turbulence.

2. In an automobile, a body comprising a blunt rounded rear end creating turbulence just to the rear thereof, openings in the surface of the rear end for the intake of air, and other openings rearward of the first to discharge the air to reduce the turbulence and thereby the resistance of the automobile.

3. In an automobile, a body comprising a blunt rounded rear end creating turbulence just to the rear thereof, openings in the surface of the rear end for the intake of air and other openings rearward of the first to discharge the air, a passage communicating with the openings and a pumping means in the passage.

4. In combination with a self propelled land vehicle, a body having a blunt rounded aft end formed by a curved juncture of body side and aft end, said body having an opening in its surface near the beginning of the curved juncture and substantially to the rear of the middle of the body as well as another opening to the rear of the first and formed to guide fluid tangentially along the surface, and a conduit in the body to establish communication between the openings.

5. In a self propelled land vehicle, a body having a blunt rounded rear end creating air turbulence to the rear thereof, said rear end being composed of a rearward face joined to the body side by a curved surface, an opening in the said surface leading into the body, and a rearward directed opening in the surface substantially aft of the middle of the body leading out of the body to discharge fluid, a conduit to establish communication between the openings, said rearward directed opening being formed so that there are walled passages just inside the surface openings to guide a flow tangentially to the body surface to relieve the said air turbulence 6. In an automobile body having a blunt rounded aft end creating air turbulence to the rear thereof and composed of a rear face joined to the body side by a curved surface, an opening in the side surface of the body for use in energizing the boundary layer on the aft end, said aft end surface having such curvature to the rear of the opening that the tangent to the surface at the opening turns through not more than twenty degrees in moving rearward a distance at least equal to ten per cent of the maximum transverse dimension of the body at the surface opening, a means of pumping in the body, and a conduit formed in the body in communication with the means of pumping and leading to the opening to direct a flow therethrough to energize the boundary layer and relieve the air turbulence.

7. In an automobile associated with a relative flow of air, a body having a blunt rear end creating air turbulence to the rear thereof and composed of a rear face joined to the body side by a curved surface, an opening in the body surface leading to a conduit said opening being in the body surface substantially to the rear of the longitudinal middle of the body, said conduit having an inlet facing into the relative air flow whereby air is discharged from the surface opening to energize the boundary layer on the aft end of the body and relieve the turbulence.

8. In an automobile, a body having a blunt rear end creating air turbulence just to the rear thereof and composed of a curved surface joining the body rearward face to the body side, an induction opening in the side surface leading into the body, a discharge opening to the rear of the induction opening to discharge rearward tangentially to the surface and a means of pumping in communication with the openings to circulate air from the induction opening to the discharge opening to relieve the air turbulence to the rear of the body.

9. In an automobile, a body comprising a blunt rounded rear end creating turbulence just to the rear thereof, an opening in the surface of the rear end for the intake of air and another opening rearward of the first to discharge the air, a passage communicating with the said openings, and a pumping means in the passage, said discharge opening being formed so that the sides overlap to direct the air virtually tangentially along the surface.

EDWARD A. STALKER.